Jan. 19, 1932. W. P. DARWIN Re. 18,334

METHOD AND APPARATUS FOR THE MANUFACTURE OF HOLLOW ARTICLES

Original Filed July 6, 1926 3 Sheets-Sheet 1

Inventor
Walton P. Darwin
By Gordon Stewart
Attorneys

Jan. 19, 1932. W. P. DARWIN Re. 18,334

METHOD AND APPARATUS FOR THE MANUFACTURE OF HOLLOW ARTICLES

Original Filed July 6, 1926 3 Sheets-Sheet 2

Inventor
Walton P. Darwin
By Gordon & Stewart
Attorneys

Jan. 19, 1932. W. P. DARWIN Re. 18,334

METHOD AND APPARATUS FOR THE MANUFACTURE OF HOLLOW ARTICLES

Original Filed July 6, 1926 3 Sheets-Sheet 3

Inventor
Walton P. Darwin
By Gordon & Sturat
Attorneys

Reissued Jan. 19, 1932

Re. 18,334

UNITED STATES PATENT OFFICE

WALTON P. DARWIN, OF WASHINGTON, DISTRICT OF COLUMBIA, ASSIGNOR, BY MESNE ASSIGNMENTS, TO THE BARRETT COMPANY, OF NEW YORK, N. Y., A CORPORATION OF NEW JERSEY

METHOD AND APPARATUS FOR THE MANUFACTURE OF HOLLOW ARTICLES

Original No. 1,648,475, dated November 8, 1927. Serial No. 120,834, filed July 6, 1926. Application for reissue filed June 20, 1930. Serial No. 462,645.

This invention relates to improvements in methods of forming hollow or curvilinear articles from plastic material such as concrete and the like. Articles of this character can be manufactured according to my improved methods rapidly and efficiently by means of novel devices forming part of this invention.

It is an object of my invention to provide a method of forming successive layers of plastic material upon a collapsible core and thereafter compressing these layers and smoothing the outer surface during the rotation of the core in such manner as to provide for a plurality of such layers. The successive layers according to my improved method may be of similar material or may be of different plastic materials reinforced or not as may be demanded by the ultimate use to which the articles are to be applied.

In carrying out the above methods my invention includes the provision of an improved collapsible core alone or in combination with retaining means which serve temporarily to hold the core in adjusted position and at the same time limit the extent to which the plastic material may be applied to the core.

It is a further object of my invention to provide a feeding device for use in applying successive layers of plastic material to a core which may be brought into receiving position with respect to the hoppers.

Another object of my invention is to provide means for carrying out the operation of rolling, compressing or otherwise treating the plastic material immediately after the same is delivered from the hoppers. This means is arranged to supply a varying pressure upon the plastic material.

It is a further object of my invention to provide means for carrying out the subsequent step of smoothing the outer surface of the plastic material as deposited upon the core and during the rotation of the latter for hardening the layer of material. This improved means for smoothing the material is provided with novel adjusting facilities whereby it may be altered in position with respect to the material treated and also varied in its position over the core proper.

As illustrative of one preferred form of device in which my invention may be embodied, I have shown on the accompanying drawings, mechanism according to the above description and in which Fig. 1 is a side elevation of a molding device;

Figure 1:
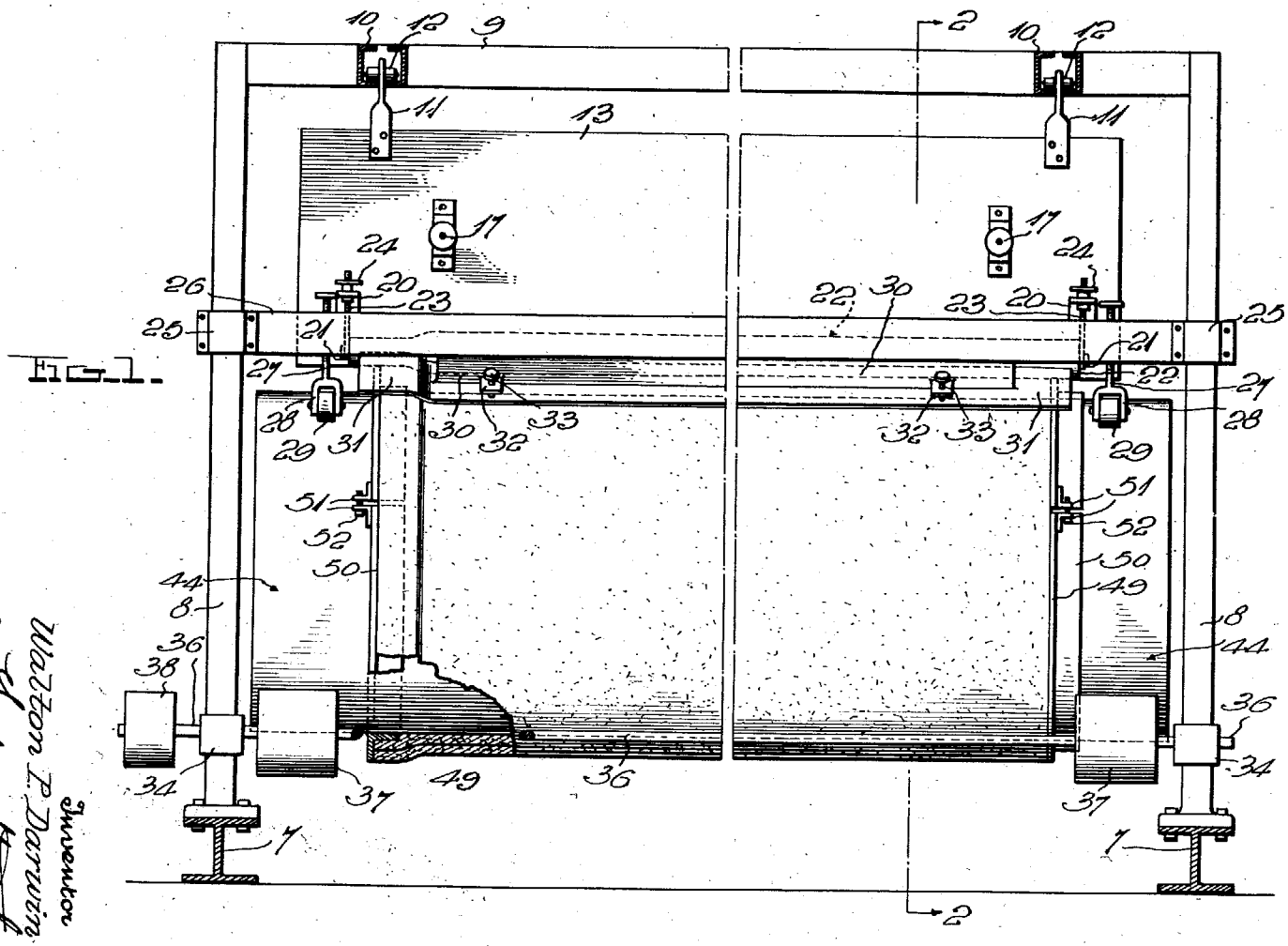

The mechanism for carrying out this invention is shown to be mounted upon two parallel rails 7, 7 to which vertical standards 8, 8 are bolted. The upper ends of the vertical standards are connected by means of cross bars 9. The cross bars 9 support a pair of longitudinal carrier tracks 10, 10.

While the tracks 10, 10 are shown to be supported only from standards 8, 8, it will be evident that they may form part of any appropriate supporting structure, it being only necessary that the tracks 10 be maintained substantially horizontal and parallel to the rails 7, 7.

Depending supports 11, 11, having rollers 12, 12 are supported from the tracks 10, 10 and in turn support a hopper device 13.

The hopper device 13 consists of a plurality of compartments such as 14, 15 and 16 each adapted to carry material of different character. The hopper compartment 14 has a bottom valve 17 while hopper compartment 15 is closed by the valve 18. The valve 19 closes the bottom of compartment 16. The valves 17, 18 and 19 may be manually and independently controlled to permit the flow of a predetermined quantity of plastic material onto the core or partially formed pipe. The hopper 13, it will be noted, is positioned to discharge material onto the core at one side of the vertical diameter of the core. As the core is rotated in the direction indicated by the arrow in Fig. 2, the material deposited thereon is moved upwardly from the point of application and then downwardly to a point where it is contacted with the screed or spreader member 31 hereinafter described. The material applied to the core, it will be noted, is supported by the core during the rotation thereof until the core leaves the spreader member 31, at which point the material has set and hardened so that it adheres to the core.

Brackets 20, 20 are mounted upon the forward side of the hopper device 13 in the manner indicated in Fig. 1. Beneath each bracket 20, 20 is mounted a link 21, pivoted to the wall of the member 13. The ends of the links 21 serve as journals for a roller 22. Vertical adjusting rods 23 connect the links 21, 21 with brackets 20, 20 and by means of screw threads on the rods 23 and hand wheels 24 the position of the roller 22 may be varied.

Slidably journaled by means of collars 25, 25 there is carried a bar 26 extending horizontally between the standards 8, 8. The bar 26 carries vertical supporting rods 27, 27, which terminate at their lower ends in bifurcated portions 28, 28. These portions serve as journals for rollers 29, 29. By means of screw threaded adjustments of the rods 27, 27 the position of the bar 26 may be varied with respect to the core upon which the rollers 29, 29 are adapted to rest.

A web 30 is bolted or otherwise attached to bar 26 and extends downwardly and to the rear thereof. The web 30 terminates in a substantially flat flexible plate or screed 31 which extends equal distances on opposite sides of the web 30.

Bars 32, 32 are held rigidly by the web 30 in a position spaced above the member 31. Adjusting bolts 33, 33, screw-threaded transversely through the rigid members 32, 32 serve to apply pressure upon one or both sides of the smoothing plate 31, and thus to vary its inclination with respect to the web 30 and the bar 26.

Standards 8, 8 each carry a sliding collar 34, 34. The standards are also slotted vertically as at 35 in Fig. 2 to receive a transverse shaft 36. The position of the shaft 36 is determined by vertical adjustment of the sliding collars 34, 34. Suitably arranged between standards 8, 8, and journaled fixedly on the shaft 36 are two supporting rollers 37, 37. One end of the shaft 36 is extended beyond standard 8 to receive a pulley or other driving means 38. The rails 7, 7 form a track for individual carriages 39 also having vertical standards 40 slotted to receive a horizontal shaft 41 carrying similar supporting rollers 42. Adjustable collars 43 are movable vertically on standards 40. Any suitable means may be employed for maintaining the carriages 39 in the desired position on the rails 7, 7.

A substantially cylindrical core 44 is shown to be split longitudinally.

U-shaped brackets 46 are attached across the slotted portion of the core 44 and carry adjustment screws 47. A wedge 48 is supported by the adjustment screws 47 and fits within the slotted portion of the core 44, with ears 45, 45 in contact with the core.

Figure 2:
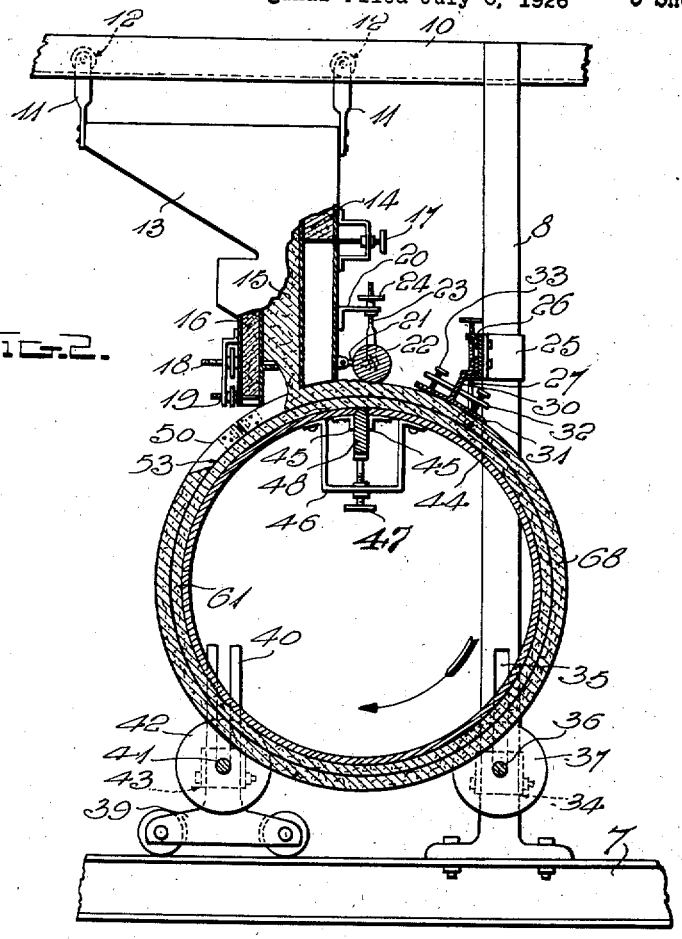
Fig. 2 is a vertical section on line 2—2 of Fig. 1.

Mounted upon the opposite ends of the outer surface of core 44 are rings 49, 49 each having an upstanding flange 50, 50. The rings are split as shown in Figs. 1 and 2 and have upstanding lugs 51 which are adapted to be bolted together by means of bolts 52, 52.

Figure 3:
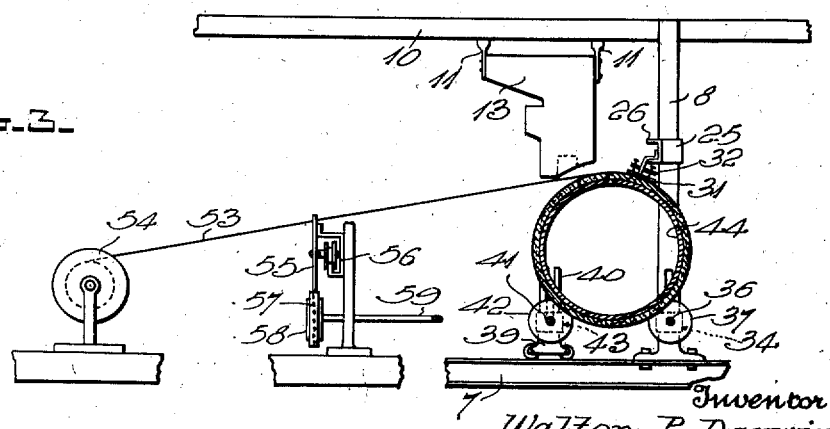
Fig. 3 is a diagrammatic view showing the method of applying a reinforcing wire between successive layers of the material.

In Fig. 3 there has been shown diagrammatically a means for wrapping a reinforcing wire 53 from a spool 54 and around the core and its superposed material. This means is indicated as a traveler 55 caused to reciprocate on track 56 by means of an endless chain 57 driven over a pair of sprocket wheels 58 from a shaft 59 which may be geared to the drive pulley 38 in the usual manner.

In this manner reinforcing wire may be wrapped spirally around the molded material and embodied in its upper surface from end to end. The ratio between the rotation of shafts 36 and 59 may be adjusted to control the number of turns of wire applied evenly over the material.

Figure 4:
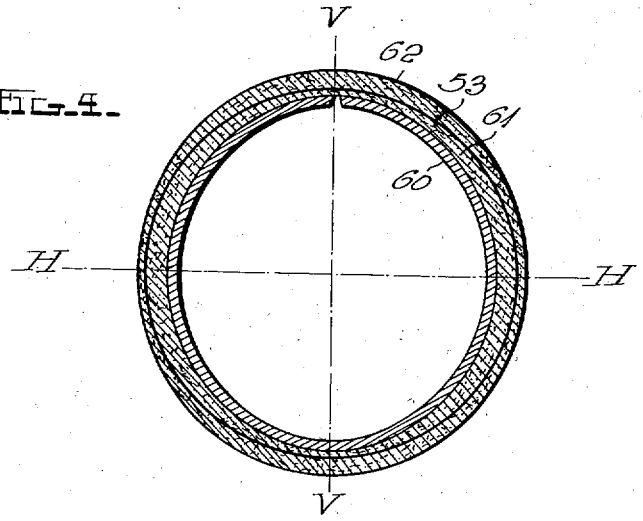
Fig. 4 is a transverse section of one form of core and the corresponding hollow article.
Figure 5:
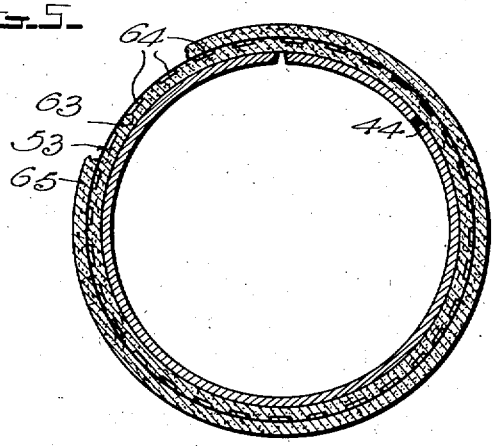
Fig. 5 is a transverse section of a core showing a modified form of article.
Figure 6:
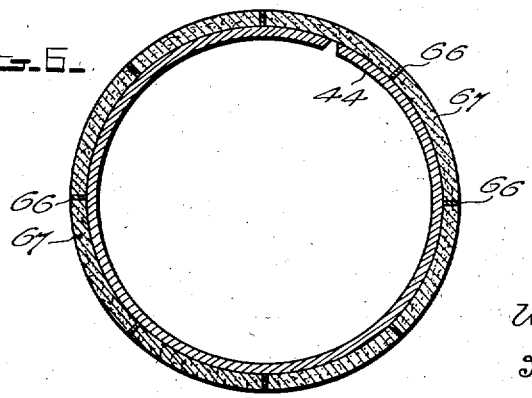
Fig. 6 is a transverse section showing the core adapted for molding partly circular articles.

This invention lends itself to the manufacture of diverse forms of articles of which several are illustrated in Figs. 4, 5 and 6.

Where concrete pipes are subjected to vertical loads as for example in culverts and the like, it is found that there is a tendency toward fracture on the inside of the pipes along their vertical diameters and on the outside of the pipes along their horizontal diameters. In Fig. 4 there is shown a pipe molded of concrete or the like in the manner already described and particularly adapted to withstand this tendency. The core 60 is of special oval cross section and split for the purpose already described in connection with the circular core 44. When this core is used in the machine illustrated in Fig. 1, the screed and its mounting are fixed upon the standards 8, 8 and the core 60 supported directly upon the vertically adjusted rollers 37 and 42. The first layer of material 61 will be circular in outer configuration after which wire or analogous material 53 will be applied as already indicated. The screed 31 will then be released from standards 8, 8 and supported upon rollers 29, 29 in contact with the core 60. On pouring the second layer of concrete 62 the latter will take the same outer configuration as the core 60 and consequently will provide a pipe of uniform thickness. In this way the reinforcing elements 53 will be brought toward the outer surface along the horizontal axis H, H, while they will be nearer the vertical axis V—V. In this way the reinforcing is placed in the material at the point where it is most effective in overcoming stresses.

In Fig. 5 a circular core 44 has been shown to be covered first with one layer 63 of material and the outer surface thereof formed with key depressions 64 at frequent intervals. These depressions may be produced by the use of special forms of rollers 22. After the first layer is wrapped with spiral reinforcing rods 53 a second layer 65 is molded having an inner surface occupying the key-recesses 64 and an outer cylindrical surface. In this way the reinforcing element 53 may be more easily buried within the semi-plastic outer surface of the layer 63 and a closer bond may be established between the layers 63 and 65.

In Fig. 6 there has been shown the use of the circular core 44 for the purpose of molding partly circular articles such as roofing tile and the like. This is accomplished by attaching to the outer surface of the core 44 a series of longitudinal strips 66 extending a substantial distance above the surface of the core. The material molded upon such a device will take the form of concavo-convex slabs 67.

In operation of the mechanisms above described it is to be understood that core 44 is spread by means of wedge 48 into close binding contact with the end rings 50. The core is then supported upon the rollers 37 and 42 and the latter adjusted vertically to bring the surface of the core to a position spaced beneath the hopper device 13 by a desired distance. The carriage 39 for rollers 42 is locked into position on rails 7, 7 and the hopper device brought forward and locked into position over the core. The screed, or spreader member 31 will control the ultimate thickness 8, 8 at an adjusted height above core 44 by means of the adjustment 27 so that the screed 31 will control the ultimate thickness of the layer 61. It is evident that the rollers 29 rest upon the ends of the core 44. Roller 22 is supported in like manner in adjusted relation from the hopper device 13. Plastic material is then allowed to flow from one of the compartments in the hopper structure 13. As shown in Fig. 2 compartment 16 is adapted for holding asphalt or other bituminous material; hopper 14 carries gravel or other loose material, while the other intermediate compartment 15 is delivering a mixture of fluent plastic binding material. As the mixture flows on to the core 44 it is compressed and rolled by means of roller 22 which may by its adjustment transmit against the plastic material a greater part of the weight of the hopper structure 13 and its contents thus effectually compacting the layer of material. As the core is slowly rotated this material is brought under the screed 31 which is adjustable in its tilting to give the appropriate smoothness of finish to the material. The continued slow rotation of core 44 will in this manner cause a complete layer 61 to be deposited. If desired the core and its molded pipe layer may be lowered from rollers 37 and 42 and set aside to harden.

However in Fig. 3 the completed layer is shown in the process of being wrapped by means of spiral turns of the reinforcing wire 53. Layer 61 may also be covered with a similar layer of material such as asphalt from compartment 16 or gravel from compartment 14 either of which may be incorporated in layer 61 by roller 22 and screed 21. In like manner a second layer 68 may be applied in the above manner and these steps repeated until the desired thickness of the pipe is attained.

As shown in Fig. 1 the screed 31 is extended at one end to provide a raised portion which causes the pipe or other cylindrical casting to take a corresponding enlargement at the end.

It will be evident that the same procedure will be carried out in the manufacture of the devices shown in Figs. 4, 5 and 6.

After the casting is completed the core and casting are removed for hardening and the core ultimately contracted for separation. Where circumstances make it desirable, the core may be a complete cylindrical pipe or the like to which the casting is permanently applied. In the manufacture of curved tile and the like as shown in Fig. 6 the hardened articles may be removed from the core without contracting the latter.

This procedure and the mechanism above described is applicable to the manufacture of pipes, columns, tile and other like articles as will be evident from the above description. While one preferred form of my invention has been described numerous changes in minor details may be carried out without departing from the scope of the invention as comprised in the appended claims.

I claim:

1. The method of forming tubular articles which consists of feeding a layer of plastic material simultaneously over the desired length of a slowly rotated core and successively rolling and smoothing the material to the thickness desired.

2. The method of forming tubular articles which consists of feeding a layer of plastic material simultaneously over the desired length of a slowly rotated core, successively compacting and smoothing said layer, feeding a second layer of material in like manner and causing the layers to coalesce.

3. The method of forming tubular articles which consists of feeding a layer of plastic material simultaneously over the desired length of a slowly rotated core, successively compacting and gauging the material to the thickness desired, incorporating reinforcing elements in the outer surface of the layer of material, feeding a second layer of material in like manner and causing the layers to coalesce.

4. The method of forming tubular articles which consists of feeding a layer of plastic material simultaneously over the desired length of a slowly rotated core, successively compacting and gauging the material to the thickness desired, incorporating reinforcing elements in the outer surface of the layer of material, feeding a second layer of material in like manner, compacting the layers through the reinforcing elements and hardening the material.

5. The method of forming tubular articles from slowly hardening fluent material which consists in feeding a layer of fluent material on the upper surface of a slowly rotated core, then immediately compacting and smoothing the material by successive steps while the material is held to the core by gravity.

6. In a machine for molding hollow articles, a tubular core, end rings carried thereby, means for rotating the core, plastic material feeding means and means for elevating the core into adjusted spaced position relative to the feeding means.

7. In a machine for molding hollow articles, a tubular core, end rings carried thereby means for rotating the core, a feed hopper, a presser roll pivotally journalled on the hopper and means for adjusting the roll relative to the hopper outlet.

8. In a machine for molding hollow articles, a tubular core, end rings carried thereby, means for rotating the core, a feed hopper having a plurality of separate compartments with parallel adjacent outlets extending axially of the core.

9. In a machine for molding hollow articles, a tubular core split axially, a wedge member, means for moving said member radially through the split portion of the core, end rings carried by the core, means for rotating the core and plastic material feeding means spaced from the outer surface of the core.

10. In a machine for molding hollow articles, a tubular core split axially, a wedge member, means for moving said member radially through the split portion of the core, contractible end rings carried by the core, means for rotating the core and plastic material feeding means spaced from the outer surface of the core.

11. In a machine for molding hollow articles, a tubular core, end rings carried by the core, means for rotating the core and plastic material feeding means movable transversely into and out of delivering position opposite the core.

12. In a machine for molding hollow articles, a tubular core, end rings carried by the core, means for rotating the core, plastic material feeding means extending axially of the core, an independent support means for varying the position of said material feeding means adjustably in its distance from the independent support and under operating conditions, and a screed on the support parallel to the feeding means.

13. In a machine for molding hollow articles, a tubular core, end rings carried by the core, means for rotating the core, plastic material feeding means extending axially of the core, an independent support, a carriage vertically slidable on the support, and a screed carried by the carriage.

14. In a machine for molding hollow articles, a tubular core, end rings carried by the core, means for rotating the core, plastic material feeding means extending axially of the core, an independent support, a carriage vertically slidable on the support, a creed carried by said carriage and means for tilting the screed.

15. In a machine for molding hollow articles, a substantially cylindrical core, a wedge for expanding the same, adjustable flanged split-rings for limiting the expansion of the core and for confining the ends of the article molded, means for revolving the core, means for elevating the same, a plurality of hopper compartments extending the full distance between the split-rings, and movable transversely of the core and into feeding position with relation thereto, a presser roller pivotally carried by the hopper compartments, means for adjusting the presser roller with respect to the core, a screed parallel to and co-extensive with the hoppers, means for slidably and adjustably supporting the screed above the core, and means for tilting the screed.

16. The steps in the method of forming a coated pipe which comprise rotating a pipe while in substantially horizontal position, applying fluid plastic material to the top of said pipe, smoothing the plastic material simultaneously with the rotation of the pipe by a spreader member positioned adjacent the side of said pipe in flat contact with the coating material on said pipe and contacting with the coating material on said pipe at a point removed from the region of application of the fluid plastic material to the top of the pipe, said member functioning to form a smooth layer of said coating material about the pipe, said pipe in its rotation carrying the plastic material into contact with the member which uniformly spreads the coating material thereabout.

17. The method of applying coating material to a tubular article which comprises supporting the article so that the upper portion thereof is exposed, rotating the article, applying plastic bituminous material to the top of said article while it is being rotated, the plastic material being at such temperature that it is fluid, smoothing the plastic material and forming a layer of such material of desired thickness on the article by contacting the plastic material thereon during the rotation thereof with a spreader-positioned adjacent the side of the tubular article in flat contact with the coating material on said article and at a point removed from the region of application of the fluid plastic material to the top of said article.

18. The herein described method of applying coating material to a pipe, including first revolving the pipe, applying the coating material while hot and in fluid condition onto the top of the pipe and applying a spreader at a point removed from the region of application of the hot fluid coating material onto the top of the pipe and in flat contact with the coating material to uniformly spread the coating and to prevent overflow of excess coating.

19. The method of forming tubular articles which comprises rotating a core while in substantially horizontal position, pouring fluid plastic material onto the top of said core at a point on said core somewhat to one side of the vertical diameter thereof, said core being rotated in a direction to cause said plastic material as applied to be supported by said core and thus prevent flow of the plastic material off of said core, and forming a layer on said core by contacting plastic material thereon during the rotation thereof with a spreader positioned adjacent the side of said core in flat contact with the coating material on said core at a point removed from the region of application of the fluid plastic material to said core, the spreader functioning to provide a smooth, even coating of said material on said core.

20. The method of applying coating material to tubular articles which comprises supporting the article in a horizontal position so that the upper portion thereof is exposed, rotating the article, applying plastic bituminous material in a fluid condition to the top of said article, while it is being rotated, to one side of the vertical diameter of said tubular article, smoothing the plastic material and forming a layer of such material of desired thickness on the article by contacting the plastic material thereon during the rotation thereof with a spreader positioned on the other side of the vertical diameter of the tubular article adjacent the side of the tubular article in flat contact with the coating material on said article.

In testimony whereof, I have hereunto affixed my signature.

WALTON P. DARWIN.